United States Patent [19]

Smith

[11] Patent Number: 5,119,075
[45] Date of Patent: Jun. 2, 1992

[54] SCHEME FOR DETERMINING POSITION OF SURFACE CONTACT OF CATHODE RAY TUBE SCREEN

[75] Inventor: Douglas C. Smith, Rumson, N.J.

[73] Assignee: AT&T Bell Laboratories, Murray Hill, N.J.

[21] Appl. No.: 539,250

[22] Filed: Jun. 18, 1990

[51] Int. Cl.⁵ .............................................. G09G 1/00
[52] U.S. Cl. .................................... 340/707; 340/706
[58] Field of Search ............... 340/706, 707, 708, 712; 250/227.13, 549

[56] References Cited

U.S. PATENT DOCUMENTS

| | | | |
|---|---|---|---|
| Re. 32,282 | 11/1986 | Baer | 340/707 |
| 3,551,896 | 12/1970 | Baskin et al. | 340/707 |
| 3,728,480 | 4/1973 | Baer | 340/707 |
| 4,329,684 | 5/1982 | Monteath et al. | 340/707 |
| 4,789,836 | 12/1988 | May | 340/707 |
| 4,999,617 | 3/1991 | Uemura et al. | 340/707 |

FOREIGN PATENT DOCUMENTS

0007238 1/1979 Japan .
0207932 12/1982 Japan .

*Primary Examiner*—Jeffery A. Brier
*Attorney, Agent, or Firm*—D. R. Padres

[57] ABSTRACT

A touch-screen scheme is employed in an arrangement wherein an inquiry and a choice of responses thereto are displayed on a CRT screen. In accordance with this scheme, a first touch-screen device is held against a predetermined spot of the screen. A selection is made by holding a second touch-screen device against the area of the screen corresponding to the desired response. When the electron beam which scans the CRT screen sweeps across the first and second touch-screen devices at different times, the two device generate two signal outputs. The touch-position or the selection is determined based on the time difference between the two signal outputs.

34 Claims, 1 Drawing Sheet

SCHEME FOR DETERMINING POSITION OF SURFACE CONTACT OF CATHODE RAY TUBE SCREEN

TECHNICAL FIELD

This invention relates to a scheme for locating a surface contact on a cathode ray tube (CRT) screen using position-determination devices.

BACKGROUND OF THE INVENTION

There are many applications where a response to information displayed on a CRT screen is desired. One such example is a service application where a cable television (TV) viewer can reserve a scheduled movie to be played on a home TV set. To this end, a menu of movie selections and phone numbers is provided on a TV screen. The viewer can then call the number corresponding to the desired selection to make the movie reservation. For details on this service application, one can refer to U.S. Pat. No. 4,763,191, issued Aug. 9, 1988 to Gorden et al., which is hereby incorporated by reference. Another application is in a video game arrangement where a video game is played on a personal computer or a television set. The video game is often programmed to display a menu of choices, which may be on, for example, skill level, sound effect, etc. The user is instructed to operate specific keys on a keyboard or a similar device to make a selection.

Nevertheless, the selection process in the above-described applications is time-consuming and oftentimes contributes to selection errors since a user must first look at the screen, determine a choice, and then examine a separate device to find the proper key or keys to effectuate this choice. Attempts have been made to facilitate the selection process. One such attempt relies on the use of a touch-sensitive screen. With this screen, a particular choice can be selected from a menu by touching with one's finger the area of the screen where that choice is displayed. Nonetheless, such screens are not desirable for certain system applications as they do not meet system cost objectives, or provide the necessary display resolution. In addition they require the use of specially designed monitors or modifications to standard monitors or TV sets.

There are, however, touch-screen techniques which can be applied to any monitor having a CRT, such as a TV set. Use of a probe with an inductive coil such as that described in a copending application entitled "Touch-Screen Arrangement," assigned to the present assignee, and hereby incorporated by reference, is one such example. This probe is hereinafter referred to as the inductive probe. Use of a light pen is another example.

With either the inductive probe or a light pen, a reference signal is required in order to determine the touch-position of the probe or the light pen on the CRT screen. The provisioning of this reference signal calls for the extraction of certain signal utilized within the monitor, thus necessitating an undesirable modification to the monitor's circuit. It would be desirable, therefore, if this reference signal provisioning could be accomplished without such limitations.

SUMMARY OF THE INVENTION

In accordance with the present invention, a first touch-screen device is held against a predetermined fixed spot on a CRT screen to provide a reference signal. A second touch-screen device is held against any selected spot on the screen. As the electron beam which scans the CRT screen sweeps across the predetermined fixed spot and the selected spot, the first and second touch-screen devices are triggered to respectively generate first and second signals, where the first signal serves as the reference signal. The touch-position of the second touch-screen device with respect to the screen is determined based on the time difference between the generation of the first and second signals.

Advantageously, the present invention is utilizable with any television set or computer monitor having a CRT screen. Moreover, each of the touch-screen devices may be inexpensively implemented using a light pen or the inductive probe.

DETAILED DESCRIPTION

Figure 1:
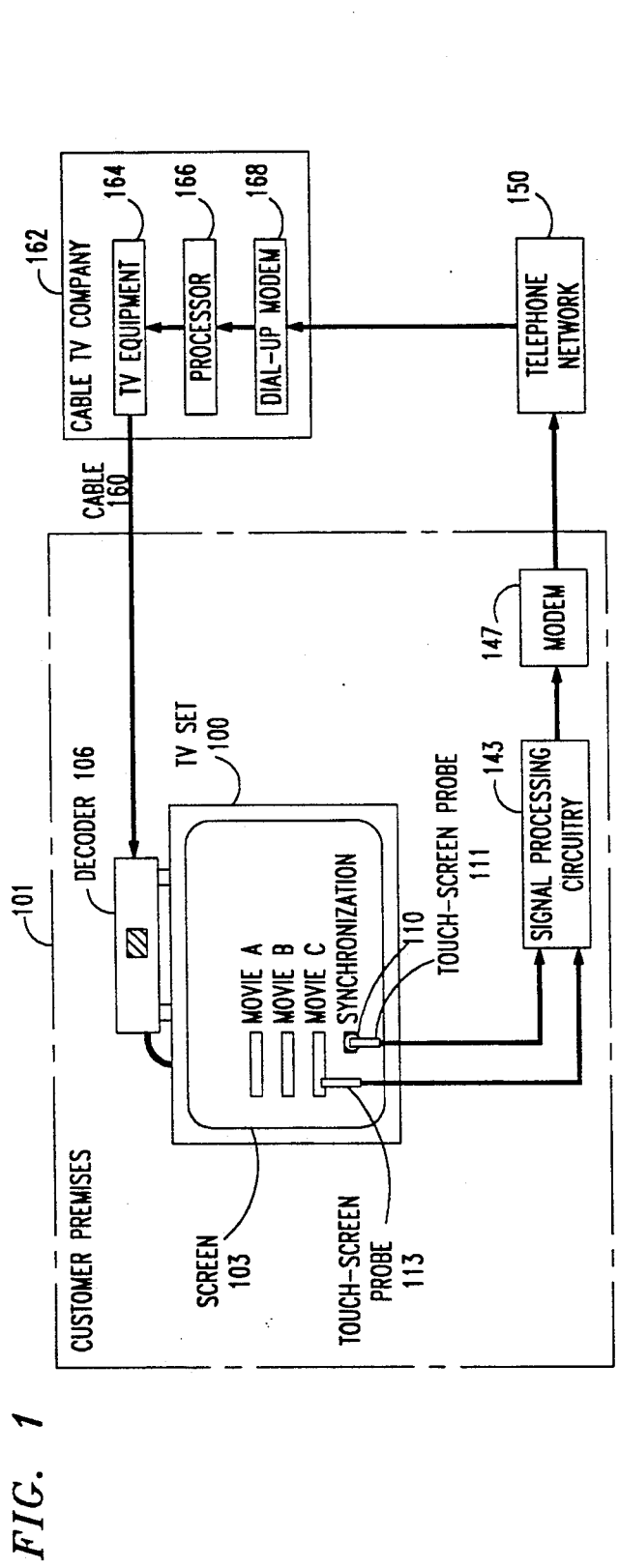
FIG. 1 is a block diagram of a touch-screen arrangement embodying the principles of the present invention.

FIG. 1 illustrates a fictitious movie-selection arrangement, whereby a cable TV customer can select a scheduled movie to be played on TV set 100 at customer premises 101. TV set 100 is of conventional design and includes a standard CRT having screen 103. A cathode ray source inside the CRT emits an electron beam which strikes the screen and produces a dot of light at the point of impact. A control circuit (not shown) in TV set 100 continuously deflects the electron beam so as to move the dot around screen 103 rapidly to generate a composite picture. The electron beam scans screen 103 in an orderly, synchronized manner, starting at the top thereof and going horizontally from left to right and slowly downward.

As is well known, in order to minimize flicker and blur associated with fast screen motions, a picture frame is interlaced with the so-called "even field" and "odd field", and each vertical scan covers either one of the two fields. As such, screen 103 is vertically scanned twice for each picture frame. The field rate is 60 Hz, and the frame rate is, accordingly, 30 Hz.

In a conventional manner, TV set 100 receives a cable broadcast from cable TV company 162, processes it and displays pictorial images on screen 103. FIG. 1 shows the screen at a particular instant, where, as part of the movie-selection arrangement, three boxes corresponding to the selections of movie A, movie B and movie C, are displayed. Also displayed is a synchronization box located at a predetermined spot on the screen.

In this move-selection arrangement, each customer is provided with a telephone number associated with dial-up modem 168 for making a movie reservation. Dial-up modem 168 is in cable TV company 162 and of conventional design. Having decided what movie to reserve, the customer at customer premises 101 calls the reservation number on a conventional modem 147. The call is answered by dial-up modem 168, thereby establishing a phone connection between customer premises 101 and cable TV company 162 through telephone network 150. After an initialization or "handshaking" process between modems 147 and 168, modem 147 is ready to communicate movie-selection information to modem 168.

In accordance with this invention, the customer makes a movie selection by respectively contacting the area within the synchronization box and the area within the box corresponding to the desired movie selection on screen 103 with touch-screen probes 111 and 113. (As illustrated in FIG. 1, the viewer has picked movie C as the desired selection.) Probes 111 and 113 each generate an electrical signal as the electron beam of the CRT in TV set 100 scans across each probe tip. Each of these probes may be, for example, a light pen, the inductive probe, etc. A light pen of conventional design when used as probe 111 or probe 113 is triggered upon detecting light from a movie-selection box or the synchronization box as it is scanned by the electron beam. The inductive probe, however, detects the magnetic field inherently associated with the electron-beam scan. In particular, the magnetic field triggers the inductive probe when held against one of the boxes scanned by the electron beam. After being triggered, either type of the probes generates an electrical signal.

The signals from touch-screen probes 111 and 113 are fed to signal processing circuitry 143. This circuitry generates a sequence of properly formatted digital signals to be transmitted by modem 147. Specifically, this sequence of signals is led by an identification signal, followed by selection bits and sync bits. The identification signal includes a plurality of bits and has a predetermined bit pattern. A particular bit pattern has been assigned to the calling customer for identifying the source of the service request, which is customer premises 101 in this instance. The generation of each of the selection bits is triggered by a signal from touch-screen probe 113. Likewise, the generation of each of the sync bits is triggered by a signal from touch-screen probe 111. The protocol of the output sequence of signal processing circuitry 143 in this embodiment further requires that the first bit following the identification signal be always a selection bit. The above-described protocol is, of course, for illustrative purposes. Thus, other similar protocols are anticipated to be devised by a person skilled in the art for his/her particular application needs.

Modem 147 transmits, in a standard way, the output sequence of signal processing circuitry 143 via the already established phone connection. Dial-up modem 168 on the other end of the connection receives the transmitted signals. The connection is thereafter maintained for a predetermined period before it is terminated by dial-up modem 168. The latter further recovers the identification signal, the sync bits and the selection bits from the received signals. Processor 166 determines the originator of the service request based on the identification signal. Moreover, it analyzes the sync and selection bits in a manner to be described. It suffices to know for now that as a result of the process, processor 166 sends a program-delivery message to TV equipment 164, indicating to the equipment that the customer at customer premises 101 has requested for movie C.

In a well-known manner, TV equipment 164 transmits TV programs through different channels on cable 160 to a plurality of customer premises, including customer premises 101. Some of these programs, including movies A, B and C, are transmitted scrambled so as to restrict a customer's access to them. Upon receiving the aforementioned program-delivery message from processor 166, TV equipment 164 sends via cable 160 a command signal addressed to decoder 106 at customer premises 101. In response to this command signal, decoder 106 descrambles the programming of the particular channel which plays movie C during the broadcast of this movie.

Figure 2:
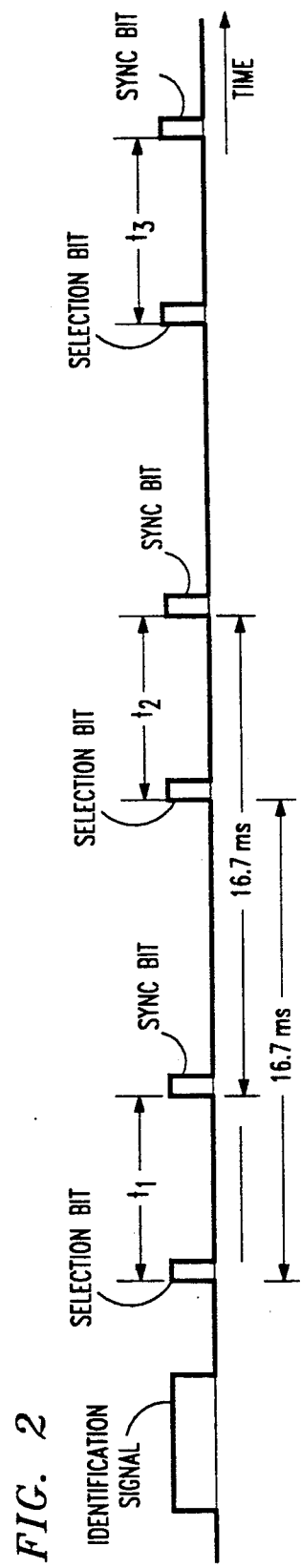
FIG. 2 illustrates a timing diagram for determining a touch-position on a CRT screen in the arrangement of FIG. 1.

It should be pointed out at this juncture that each particular spot on screen 103 is scanned by the electron beam of the CRT in TV set 100 at 60 Hz, which corresponds to the aforementioned field rate. Since a selection bit is generated each time when the electron beam scans across touch-screen probe 113, this bit repeats at 60 Hz (or 16.7 ms intervals) as illustrated in FIG. 2. Similarly, the sync bit also repeats at 60 Hz as it is generated each time when the electron beam scans across touch-screen probe 111. What is more, each electron-beam scan triggers the generation of a bit-pair, comprising a selection bit and a sync bit. As shown in FIG. 2, a plurality of such bit-pairs, preceded by the aforementioned identification signal, are communicated during the phone connection between customer premises 101 and cable TV company 162. The actual number of the bit-pairs communicated varies directly with the length of the time that probes 111 and 113 have been held against screen 103 during the phone connection.

Processor 166 determines the length of time by which a selection bit leads the corresponding sync bit in each bit-pair. It also records a predetermined number of samples of the leading time such as $t_1$, $t_2$ and $t_3$. It thereupon determines a final leading time, t, based on the majority of the leading-time samples. Processor 166 further derives, from the value of t, the touch-position of touch-screen probe 113 with respect to the synchronization box on screen 103.

It should be noted at this point that each selection bit marks the time that the electron beam sweeps across the movie C box touched by probe 113; and the sync bit marks the time that the electron beam sweeps across the synchronization box. It should also be noted that the electron beam scans through screen 103 once every $1/60$ Hz = 16.7 ms, in accordance with the aforementioned 60 Hz field rate. This being so, the touch-position of probe 113 on screen 103 with respect to the synchronization box is determinative. Since the location of the synchronization box on screen 103 is known a priori, it thus affords a fixed reference for evaluating the touch-position. In fact, the relative vertical distance of the touch-position from the synchronization box can be expressed as a fraction of the vertical distance across screen 103. This fraction can be shown to be t (ms) /16.7 ms. (For example, if the touch-position and the synchronization box is one-sixth of the screen apart from each other, t would be 2.78 ms long.) Processor 166 communicates the aforementioned program-delivery message, part of which represents such fraction indicating the movie C selection, to TV equipment 164.

The foregoing merely illustrates the principles of the present invention. It will thus be appreciated that those skilled in the art will be able to devise numerous other arrangements which embody the principles of the invention and are thus within its spirit and scope.

For example, in the disclosed arrangement, the customer when making a movie selection needs to hold a touch-screen probe against a selection box and another probe against the synchronization box simultaneously. To facilitate the selection process, it may be desired to have the probe for the synchronization box— probe 111—be affixed to the screen. This can be achieved by means of a suction cup 110 or a similar device placed at the tip of probe 111. Moreover, although in the disclosed arrangement the final leading time—t—is computed by a processor in the cable TV company, it may be desired to compute t at the customer premises and then transmit a signal representing t to the cable TV company instead. Finally, although the disclosed arrangement is embodied in the form of various discrete electronic building blocks and components, the invention could equally as well be embodied in an arrangement in which the functions of any one or more of those building blocks and components or indeed, all of the functions thereof, are realized. for example, by one or more appropriately programmed processors.

I claim:

1. A system having a display device wherein an electron beam scans a screen associated with said display device, said system comprising means for detecting, from the exterior of said display device, said electron beam as it scans past a first spot and a second spot on said screen, said first spot being in a predetermined fixed location on said screen, and said second spot being in a variable location different from said predetermined fixed location, and means for determining a time difference between the detection of said electron beam as it scans past the first and second spots.

2. The system of claim 1 wherein said determining means further comprises means responsive to said detecting means for determining said variable location relative to said predetermined fixed location.

3. The system of claim 1 wherein said detecting means further comprises a first touch-screen device and a second touch-screen device which are respectively disposed in close proximity to said first spot and said second spot, and which are responsive to the electron-beam scan on said screen.

4. The system of claim 3 wherein said first touch-screen device can be affixed to said screen.

5. The system of claim 4 wherein said first touch-screen device is affixed to said screen using a suction cup.

6. The system of claim 3 wherein each of said first touch-screen device and said second touch-screen device is a light pen.

7. The system of claim 3 wherein each of said first touch-screen device and said second touch-screen device detects a magnetic field associated with said electron-beam scan.

8. The system of claim 1 wherein said display device is a TV set.

9. The system of claim 1 wherein said display device is a computer monitor.

10. A system having a CRT screen which is scanned by an electron beam, said system comprising means for displaying a plurality of choices on said CRT screen, each choice being associated with a different CRT screen location, means for selecting one of said choices, said selecting means being in close proximity to a first CRT screen location associated with the selected choice and also in close proximity to a second CRT screen location not associated with any of said plurality of choices, and means for providing an output signal representative of the selected choice, said providing means being responsive to said electron beam passing said first and second CRT screen locations.

11. The system of claim 10 wherein said selecting means includes a first touch-screen device and a second touch-screen device which are responsive to the electron-beam scan.

12. The system of claim 11 wherein said first touch-screen device can be affixed to the predetermined fixed area on said CRT screen.

13. The system of claim 12 wherein said first touch-screen device can be affixed to said CRT screen using a suction cup.

14. The system of claim 11 wherein each of said first touch-screen device and said second touch-screen device is a light pen.

15. The system of claim 11 wherein each of said first touch-screen device and said second touch-screen device detects a magnetic field associated with said electron-beam scan.

16. The system of claim 10 wherein said CRT screen is included in a TV set.

17. The system of claim 10 wherein said CRT screen is included in a computer monitor.

18. A method for use in a system having a display device wherein an electron beam scans a screen associated with said display device, said method comprising the steps of detecting, from the exterior of said display device, said electron beam as it scans past a first spot and a second spot on said screen, said first spot being in a predetermined fixed location on said screen, and said second spot being in a variable location different from said predetermined fixed location, and determining a time difference between the detection of said electron beam as it scans past the first and second spots.

19. The method of claim 18 wherein said determining step further comprises the step of determining said variable location relative to said predetermined fixed location in response to said detecting step.

20. The method of claim 18 wherein said detecting step is performed using a first touch-screen device and a second touch-screen device which are respectively disposed in close proximity to said first spot and said second spot, and which are responsive to the electron-beam scan on said screen.

21. The method of claim 20 wherein said first touch-screen device can be affixed to said screen.

22. The method of claim 21 wherein said first touch-screen device is affixed to said screen using a suction cup.

23. The method of claim 20 wherein each of the first and second touch-screen devices is a light pen.

24. The method of claim 20 wherein each of the first and second touch-screen devices detects a magnetic field associated with said electron-beam scan.

25. The method of claim 18 wherein said display device is a TV set.

26. The method of claim 18 wherein said display device is a computer monitor.

27. A method for use in a system having a CRT screen which is scanned by an electron beam, said method comprising the steps of displaying a plurality of choices on said CRT screen, each choice being associated with a different CRT screen location, selecting one of said choices, using a selecting apparatus which is disposed in close proximity to a first CRT screen location associated with the selected choice and and which is also disposed in close proxmity to a second CRT screen location not associated with any of said plurality of choices, and providing an output signal representative of the selected choice in response to said electron beam passing said first and second CRT screen locations.

28. The method of claim 27 wherein said selecting apparatus includes a first touch-screen device and a second touch-screen device which are responsive to the electron-beam scan.

29. The method of claim 28 wherein said first touch-screen device can be affixed to the predetermined fixed area on said CRT screen.

30. The method of claim 29 wherein said first touch-screen device can be affixed to said CRT screen using a suction cup.

31. The method of claim 28 wherein each of the first and second touch-screen devices is a light pen.

32. The method of claim 28 wherein each of the first and second touch-screen devices detects a magnetic field associated with said electron-beam scan.

33. The method of claim 27 wherein said CRT screen is included in a TV set.

34. The method of claim 27 wherein said CRT screen is included in a computer monitor.

* * * * *